(12) United States Patent
Hesse et al.

(10) Patent No.: US 9,230,706 B1
(45) Date of Patent: Jan. 5, 2016

(54) PROCESS FOR FORMING WIRE HARNESSES

(71) Applicant: PRETTL Electric Corp., Greenville, SC (US)

(72) Inventors: Andreas Hesse, Simpsonville, SC (US); Stefan Louis Barnes, Woodruff, SC (US)

(73) Assignee: PRETTL ELECTRIC CORP., Greenville, SC (US)

( * ) Notice: Subject to any disclaimer, the term of this patent is extended or adjusted under 35 U.S.C. 154(b) by 0 days.

(21) Appl. No.: 14/475,665

(22) Filed: Sep. 3, 2014

(51) Int. Cl.
*H01R 43/20* (2006.01)
*H01B 1/00* (2006.01)

(52) U.S. Cl.
CPC ............... *H01B 1/00* (2013.01); *Y10T 29/4921* (2015.01); *Y10T 29/49171* (2015.01)

(58) Field of Classification Search
CPC ............ B60R 16/0222; B60R 16/0207; Y10T 29/49002; Y10T 29/49139; Y10T 29/49174
USPC ............ 29/876, 837, 842, 854, 857; 439/364, 439/540.1, 544, 571
See application file for complete search history.

(56) References Cited

U.S. PATENT DOCUMENTS

| | | | |
|---|---|---|---|
| 4,658,503 A * | 4/1987 | Eaton ...................... | H01R 43/20 29/837 |
| 5,328,388 A * | 7/1994 | Fust ...................... | H01R 13/514 439/364 |

* cited by examiner

*Primary Examiner* — Thiem Phan
(74) *Attorney, Agent, or Firm* — McNair Law Firm, P.A.; Douglas L. Lineberry

(57) ABSTRACT

An improved process for wire harness assembly using air pressure to seat and manufacture wiring harnesses.

9 Claims, 4 Drawing Sheets

PROCESS FOR FORMING WIRE HARNESSES

BACKGROUND OF THE INVENTION

1) Field of the Invention

The present disclosure relates to an improved process for forming wire harnesses for placement in devices.

2) Description of Related Art

In various industries, electrical or computer-communication related wires must be gathered and specifically placed within a device to provide electricity and communication between the various sections of the device, such as between the driver controls of an automobile and the engine. Most automobiles today are replete with electronic devices, which require special wiring throughout the vehicle. This wiring provides electrical power and communication for radios, door locks, door windows, and automotive computer accessories.

Placement of wiring may be accomplished with a wiring harness; a wiring configuration designed for specific wiring devices. The harness provides a single connection point for multiple wires, as well as positions and provides stability and protection for the wires. It also may form junctions for allowing electrical communication between different wiring. Wiring is a complicated process that typically requires training and retraining personnel as it is a meticulous, time-consuming job.

Electrical wiring, especially in more complex devices, requires complicated configurations. Most wiring diagrams include multiple wires where each wire is color coded to represent a specific electronic feature. The wiring harness simplifies this configuration. It provides one connection point for multiple wiring configurations. For example, most auto alarm systems, which contain complicated multiple wire configurations, are connected using a wiring harness. The harness makes installation easier because the wires join at one connection point. Without the harness each wire would need to be manually connected to each wire of the alarm; a very time consuming, costly and error-prone process.

Current automated processes for manufacturing wire harnesses results in various issues that hinder product quality and produce unnecessary waste materials. Current wire harness forming processes may bend or buckle wires during insertion. Leading to faulty connections or wiring harnesses with structural defects that may later fail and impede performance. Moreover, in today's process lines, portions of the wire harness may be preassembled and delivered to a manufacturer or assembler for further processing. In these situations, a manufacturer using current harness assembly techniques must not only treat the assembly carefully, but must also deal with tolerances for devices the manufacturer did not assemble or create.

Indeed, modern applications may use a sleeve or cap to protect the wiring junction and wiring. Use of the sleeve requires "seating" the junction and wires within the sleeve and securing same to ensure the wires remain in the proper configuration. Securing the wires and junction within the harness may be accomplished by crimping the sleeve with the wires and junction positioned therein. However, this may lead to bending wires, and creating "wire memory" issues where a crimped wire carries a bend into a new section of the wiring assembly after the bend forms. Moreover, crimping is machinery intensive and requires specific, precise tooling to prevent damaging the wires and junctions. Further, crimping and current assembly methods, such as pulling a wire harness into place inside the sleeve, may hinder or damage terminal placement, bend terminals, cross wires, or damage accoutrements such as locking tabs. Moreover, securing wire harnesses in place via pulling or tugging is an inconsistent method that does not allow for precise measurements regarding wire and junction placement within a sleeve or cap. Further, current testing methods include the twist test to determine how many revolutions wire or other material can withstand. This test can be used to measure wire twist before breakage or twist and load characteristics. This test may check a wire for brittleness, inclusions, hidden seams and other flaws. Prior assembly methods tend to produce products that do not perform well during the twist test due to stresses placed on the wire during assembly.

What is needed is an improved process for wire harness assembly where harnesses may be assembled without damaging the wire assembly while also reducing waste and coming as close to zero defect production as possible.

SUMMARY OF THE INVENTION

The above objectives are accomplished according to the present invention by providing an improved process for assembling a wire harness assembly. The process includes having a wiring harness engaged with a cap, wherein the cap or protective sleeve is positioned distally from the wiring harness. The wire harness includes a ceramic junction engaged with at least one terminal. The at least one terminal is engaged with at least one trailing wire and the at least one trailing wire is engaged with a grommet. The wire harness is positioned within the cap so that the grommet engages a pre-clinch formed within the cap. Air pressure is used to seat the wire harness within the cap.

In a further embodiment, the grommet engages the at least one trailing wire approximate the at least one terminal. The grommet may move along the at least one wire as air pressure is applied to the grommet. Movement of the grommet may seat the ceramic junction within the interior of the cap. In a further embodiment, air pressure may move the grommet into a final position with respect to the cap. The final position of the grommet within the cap may be determined by the grommet engaging with an end stop formed within the cap. In a further embodiment, the final position of the grommet may be located below the pre clinch formed within the cap.

In another embodiment, the wire harness may be engaged with the cap by having the at least one wire of the wire harness pass through an interior of the cap. In a still further embodiment, the grommet may pull the at least one wire to a neutral position.

In a still further embodiment, an improved system for assembling a wire harness is provided. The system includes a wire harness that may include at least one wire engaged with at least one terminal. The at least one terminal may be engaged with a ceramic junction. The system also possesses a grommet that may engage an outer surface of the at least one wire. A hollow cap is also provided as well as an air pressure source. The air pressure source may act upon the wire harness to position the wire harness within the hollow cap. The hollow cap may include a pre clinch and the grommet may engage the pre clinch prior to air pressure acting upon the wire harness.

In a further embodiment, movement of the grommet may seat the wire harness within the hollow cap. Still further, the grommet may travel along a length of the at least one wire when air pressure is applied to the grommet. In a still yet further embodiment, the final position of the grommet is controlled by an interior structure of the hollow cap. In the final position, the grommet may engage an end stop formed by the hollow cap. In another embodiment, the wire harness may be engaged with the hollow cap by having the at least one wire pass through an interior of the hollow cap. In a yet further embodiment, the grommet may pull the at least one wire to a neutral position.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
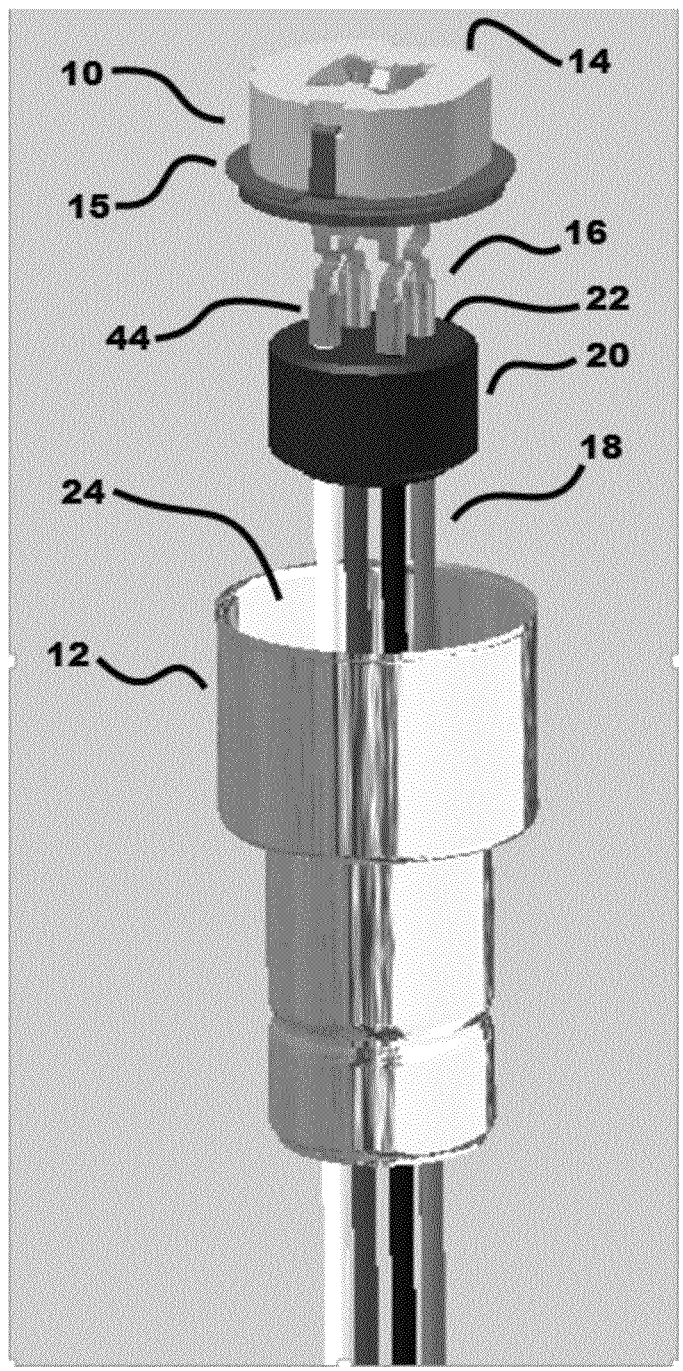
FIG. 1 shows a plan view of a wiring harness assembly of the present disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

The current disclosures provides an improved process and system for assembling a wire harness assembly and resolves various issues with current wire assembly methods. This includes removing the impact of crimping a sleeve or cap on the bores within grommets. The process provides more space to handle the wire assembly, and allows for easier insertion into the junction, as the cap may be placed distally from the junction, terminals, and wiring prior to inserting them into the cap. Moreover, the current disclosure does away with various damage, such as causing bends in the wire, creating faulty wire memory, stripping wiring insulation, separating wiring from terminals, etc., to the wiring and junctions caused by pulling the wire through the sleeve and subsequently crimping the wiring harness in place. Further, distancing the sleeve from the wiring ends allows for accurate placement of a grommet without having to compensate for the bore holes of the grommet distorting or shrinking due to the inward pressure sleeve placed on the grommet.

Further, by using air pressure to seat the grommet and junction in the sleeve, precise measurements may be made regarding insertion forces and their impact on the device, as opposed to existing methods where pulling and tugging place varied and uncertain stresses on the wiring, junction and grommet. Moreover, the grommet may be positioned over a portion of the terminal, such as the terminal fork, which allows for easier assembly of the wiring to the terminal. Indeed, this also allows for a quick visual inspection to assure a proper connection, which is currently not possible when the grommet is position in the sleeve prior to wire assembly.

As shown in FIG. 1, a wire harness 10 may engage a cap 12. Wire harness 10 may include a ceramic junction 14 that may be engaged with at least one terminal 16. Although FIG. 1 shows four (4) terminals 16, more or less terminals 16 are within the scope of this disclosure depending on the electrical or circuit junction that needs to be formed. Ceramic junction 14 may be formed from ceramic or other materials as known to those of skill in the art and may be configured to engage with opposing male or female members (not shown) to connect and complete a circuit or electrical connection as known to those of skill in the art. Ceramic junction 14 may also include a collar 15. Collar 15 may be formed from a spring washer and may be integrated or separate from ceramic junction 14. Terminal 16 may be engaged with at least one trailing wire 18. Even though FIG. 1 shows four trailing wires 18, more or less wires are within the scope of this disclosure and may be varied to achieve the necessary electrical or circuit junction that needs to be formed. Trailing wire 18 may comprise any type of wiring as known to those of skill in the art. Further, terminal 16 may engage trailing wire 18 via engagements as known to those of skill in the art, including but not limited to Radial 4-Way Crimp, Closed Crimp Barrels, Bar Crimp, "B" Crimp, conductor crimps coupled with insulation crimps such as "B" Crimp, "O" Crimp, overlapping crimp; resistance welding, laser welding, and soldering.

Trailing wire 18 may engage a grommet 20. Grommet 20 may be formed of plastics, synthetics, polymers, natural rubbers, or other compositions as known to those of skill in the art. Grommet 20 may engage trailing wire 18 by having a cavity 22 formed in grommet 20. The number of cavities 22 should at least equal the number of trailing wires 18 but more cavities 22 may be formed for compression relief, stability, aesthetics, or other purposes as known to those of skill in the art. Grommet 20 may frictionally engage trailing wire 18. Lubricant may be added to grommet 20 to ease insertion of trailing wire 18. Alternatively, friction agents may be added to increase frictional engagement between grommet 20 and trailing wire 18. Grommet 20 may engage trailing wire 18 at the point of engagement with terminal 16, above the point of engagement between the two, or below the point of engagement. In one embodiment, grommet 20 engages trailing wire 18 below the point of engagement with terminal 16. In a further embodiment, grommet 20 may engage terminal 16 and only partially engage trailing wire 18. In a different embodiment, grommet 20 may not engage trailing wire 18 prior to insertion of the wire harness 10 into cap 12 and may be positioned on fork 44 of terminal 16. As FIG. 1 shows, trailing wire 18 may be inserted through a hollow 24 created within cap 12.

Figure 2:
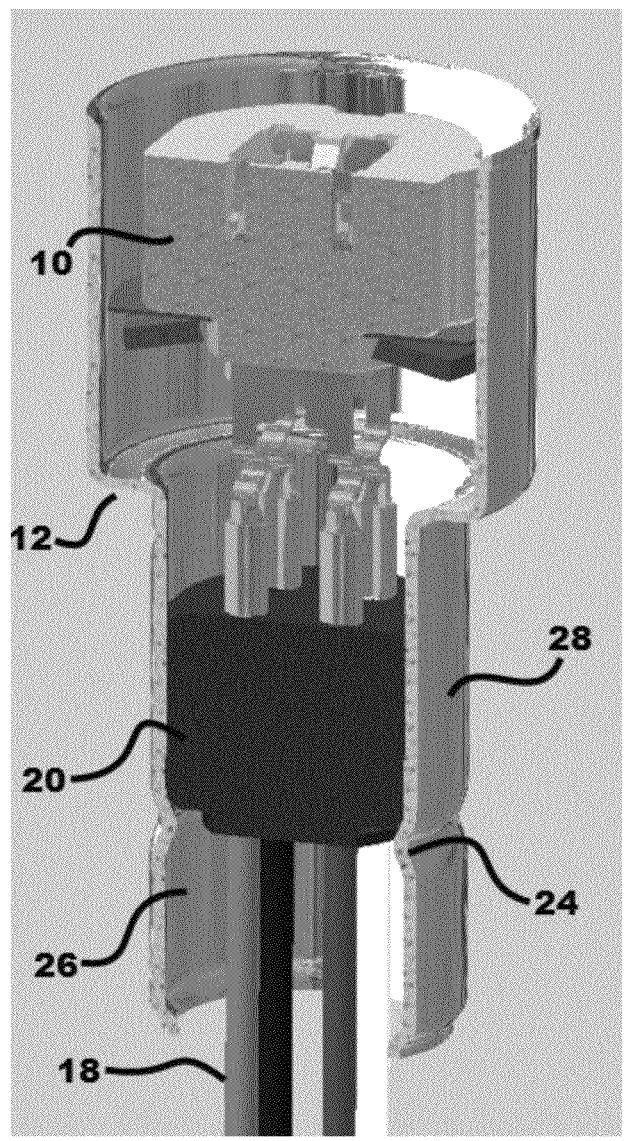
FIG. 2 illustrates a cut away view of a wiring harness assembly of the present disclosure.

FIG. 2 shows a cut away view of a wiring harness assembly of the present disclosure. As FIG. 2 illustrates, wire harness 10 may be positioned within cap 12 so that grommet 20 may engage a pre-clinch 24 formed within the interior 26 of cap 12. While pre-clinch 24 is illustrated as a deformation in cap 12 that may be visible on exterior 28 of cap 12, pre-clinch 24 may comprise a ledge, tabs, internal disc, or other means as known to those of skill in the to allow grommet 20 to rest against pre-clinch 24. Pre-clinch 24 may also be formed such that it does not alter exterior 28 of cap 12. The wire harness 10 may be positioned within cap 12 via pulling wire harness 10 into cap 12 until grommet 20 engages pre-clinch 24.

Figure 3:
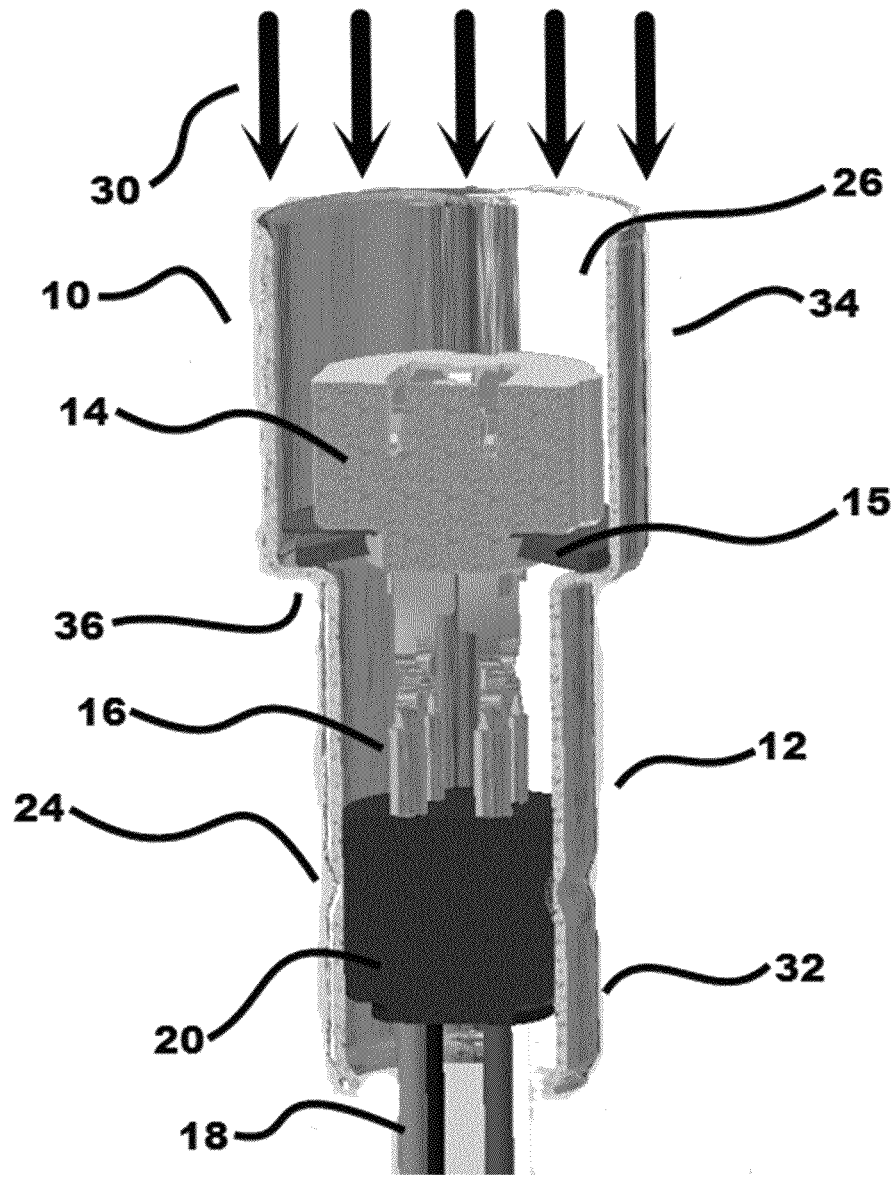
FIG. 3 illustrates a cut away view of a wiring harness assembly of the present disclosure with air flow being applied to the assembly.

FIG. 3 illustrates a cut-away view of a wire harness assembly of the present disclosure wherein air flow 30, illustrated by downward arrows, is directed onto wire harness 10 and cap 12. In a preferred embodiment, air flow 30 is supplied from filtered or clean room air from a reservoir or main line pressure. Air flow 30 is directed into the cap via means such as devices used for pressure testing piping, as known to those of skill in the art. Air flow 30 may be released by a pneumatic valve, which may be manually, pilot air or electrically operated. In a further embodiment, an independent piston/cylinder combination may be employed where the piston is formed through the cylinder to create the necessary air pressure to seat the grommet within the cap. Air flow 30 may be directed until grommet 20 is seated. In one embodiment, air flow 30 may be directed substantially perpendicular to the surface of grommet 20 facing air flow 30. Air flow 30 may employed varied pressure to move grommet 20. However, in a preferred embodiment, air flow 30 maintains a constant pressure to seat grommet 20. At essence, air flow 30 acts upon grommet 20 along an axis of cap 12 to cause grommet 20 to act as a "piston" due to interference with the pre-clinch of cap 12 and drives grommet 20 toward the lower ambient, typically atmospheric pressure but other pressures are hereby considered applicable as known to those of skill in the art, by the pressure differential across grommet 20 within cap 12.

In a further embodiment, various air pressure ranges may be employed in the current disclosure. For instance, a pressure of between 0.1 to 15 Bar may be employed. In one particular embodiment, an air pressure of between 3 to 10 Bar may be employed. This pressure may be employed over a variety of time ranges, such as from 0.1 to 10 seconds. In a further embodiment, the duration of the air flow may be from 0.5 to 5 seconds. Various pressures and durations of air flow may be used depending on the device being seated. A program timer may also be incorporated to control the duration of the air flow. The timer may also be connected to a sensor such that air flow may time out if a grommet is not detected in a desired position after a particular air flow time has expired.

As FIG. 3 illustrates, air flow 30, via the existing pressure differential, serves to move grommet 20 within cap 12 such that grommet 20 moves past pre-clinch 24 and into the distal section 32 of cap 12 and away from proximal section 34 of cap 12. Air flow 30 may cause grommet 20 to slide along the length of trailing wire 18. As grommet 20 moves inside cap 12, frictional engagement between grommet 20 and trailing wire 18 serves to pull ceramic junction 14 into cap 12 and seat ceramic junction 14. In order to seat ceramic junction 14, movement of ceramic junction 14 may be halted by forming a shelf 36 on interior 26 of cap 12. Shelf 36 may be formed by crimping cap 12, forming an internal ledge, or otherwise forming a protrusion or other structure into the interior 26 of cap 12, as known to those of skill in the art, to engage ceramic junction 14 or shelf 15 as known to those of skill in the art.

Figure 4:
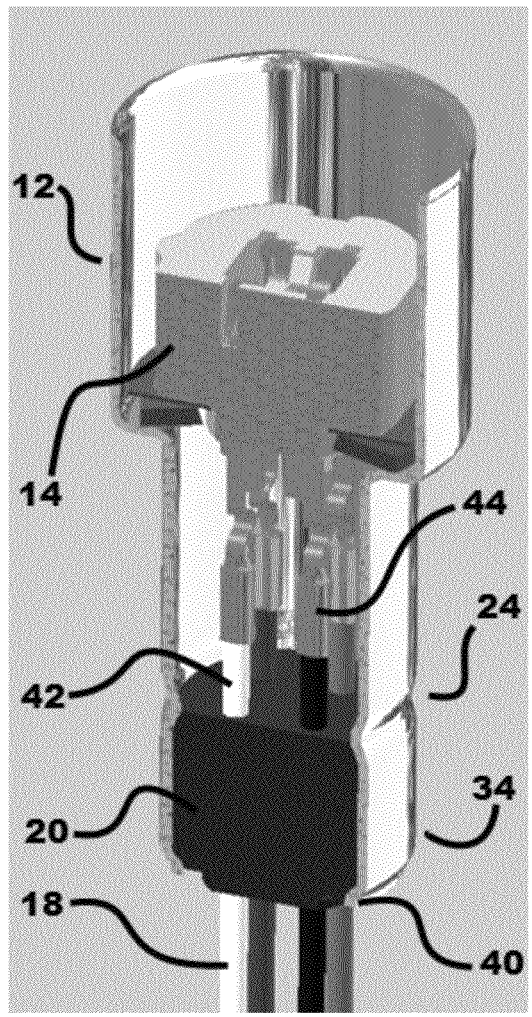
FIG. 4 illustrates a cut away view of a wiring harness assembly of the present disclosure after air flow has been applied to the assembly.

FIG. 4 shows a wire harness assembly of the current disclosure after application of air flow 30. As FIG. 4 illustrates, ceramic junction 14 has been seated within cap 12 and grommet 20 has moved past pre clinch 24. In addition, grommet 20 has moved distally along trailing wires 18 and come to rest against end stop 40. End stop 40 may be formed by crimping distal end 34 of cap 12. Further, movement of grommet 20 may reveal upper portion 42 of trailing wires 18. Another benefit of the current disclosure is that movement of grommet 20 may also pull trailing wires 18 into an end position within cap 12. Grommet 20 acts upon trailing wires 18 to pull them and terminals 16 into fully seated positions. Thus, the ceramic is pulled into its seated position in a more precise and controlled manner, parallel to the cap seat area. X-ray analysis of the current disclosure shows that the effect of the tension of grommet 20 may also straighten out bent terminals 16 during the seating process.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An improved process for assembling a wire harness assembly comprising:
   having a wiring harness engaged with a cap, wherein the cap is positioned distally from the wiring harness;
   the wiring harness comprising:
      a ceramic junction engaged with at least one terminal;
      the at least one terminal engaged with at least one trailing wire; and
      the at least one trailing wire engaged with a grommet;

positioning the wiring harness within the cap so that the grommet engages a pre-clinch formed within the cap; and using air pressure to seat the wiring harness within the cap.

2. The improved process for assembling a wire harness assembly of claim 1, wherein the grommet engages the at least one trailing approximate the at least one terminal.

3. The improved process for assembling a wire harness assembly of claim 2, wherein the grommet moves along the at least one wire as air pressure is applied to the grommet.

4. The improved process for assembling a wire harness assembly of claim 1, wherein movement of the grommet seats the ceramic junction within the interior of the cap.

5. The improved process for assembling a wire harness assembly of claim 1, wherein air pressure moves the grommet into a final position with respect to the cap.

6. The improved process for assembling a wire harness assembly of claim 5, wherein the final position of the grommet within the cap is determined by the grommet engaging with an end stop formed within the cap.

7. The improved process for assembling a wire harness assembly of claim 5, wherein the final position of the grommet is located below the pre clinch formed within the cap.

8. The improved process for assembling a wire harness assembly of claim 1, wherein the wire harness is engaged with the cap by having the at least one wire of the wire harness pass through an interior of the cap.

9. The improved process for assembling a wire harness assembly of claim 1, wherein the grommet pulls the at least one wire to a neutral position.

\* \* \* \* \*